United States Patent
Bordow et al.

(10) Patent No.: US 12,475,351 B2
(45) Date of Patent: Nov. 18, 2025

(54) SYSTEMS AND METHODS FOR DETERMINING A SECURITY VULNERABILITY OF A COMPUTER SYSTEM

(71) Applicant: Wells Fargo Bank, N.A., San Francisco, CA (US)

(72) Inventors: Peter Bordow, Fountain Hills, AZ (US); Abhijit Rao, Irvine, CA (US); Jeff J. Stapleton, O'Fallon, MO (US); Omar B. Khan, Richmond, VA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 102 days.

(21) Appl. No.: 18/583,543

(22) Filed: Feb. 21, 2024

(65) Prior Publication Data
US 2025/0265441 A1 Aug. 21, 2025

(51) Int. Cl.
*G06N 3/006* (2023.01)
*G06F 3/16* (2006.01)
(Continued)

(52) U.S. Cl.
CPC ............ *G06N 3/006* (2013.01); *G06F 3/167* (2013.01); *H04L 41/16* (2013.01); *H04L 63/1433* (2013.01)

(58) Field of Classification Search
CPC .......... G06N 3/006; G06N 3/08; G06N 3/084; G06N 3/045; G06N 5/01; G06N 7/01; G06F 18/213; G06F 18/211; G06F 18/24133; G06F 18/214; G06F 30/27; G06F 3/167; G06F 9/5038; B25J 9/163; G10L 15/24; G10L 15/30; G10L 15/22; G10L 15/1822; G07F 17/3225; G07F 17/326
See application file for complete search history.

(56) References Cited

U.S. PATENT DOCUMENTS

2020/0336507 A1 10/2020 Lee
2021/0158162 A1* 5/2021 Hafner .................. G06N 3/006
(Continued)

FOREIGN PATENT DOCUMENTS

CN 110968873 A 4/2020

OTHER PUBLICATIONS

Temara; "Maximizing Penetration Testing Success With Effective Reconnaissance Techniques Using ChatGPT", Retrieved from https://doi.org/10.21203/rs.3.rs-2707376/v1; Mar. 21, 2023 (10 pages).

*Primary Examiner* — Kyung H Shin
(74) *Attorney, Agent, or Firm* — K&L Gates LLP

(57) ABSTRACT

Systems, apparatuses, methods, and computer program products are disclosed for determining a security vulnerability of a computer system. An example method includes initializing a policy based on initial policy data. The example method further includes selecting an action based on the policy and executing, by agent circuitry, the action in the environment. The example method further includes, subsequent to executing the action in the environment, receiving an observation of the environment and determining an updated state from the set of states based on the observation. The example method further includes determining, by the policy, a reward based on the updated state and updating the policy based on the updated state.

20 Claims, 5 Drawing Sheets

(51) Int. Cl.
*H04L 9/40* (2022.01)
*H04L 41/16* (2022.01)

(56) References Cited

U.S. PATENT DOCUMENTS

2021/0182718 A1* 6/2021 Li .................. G07F 17/3225
2022/0157315 A1* 5/2022 Raux ................. G06F 3/167
2022/0201042 A1   6/2022 Crabtree

* cited by examiner

SYSTEMS AND METHODS FOR DETERMINING A SECURITY VULNERABILITY OF A COMPUTER SYSTEM

BACKGROUND

In computer network security, penetration testing is the process of simulating attacks on a computer system to detect security vulnerabilities. Teams of highly trained human experts conduct penetration tests by attempting to gain access or exploit vulnerabilities in a test system and report their findings. The goal of such testing is to gain security knowledge of the system that may be used to strengthen against actual attacks in the future.

BRIEF SUMMARY

Due to the sophistication and rapid evolution of cybersecurity threats to secured computer networks, penetration testing is an invaluable tool of network administrators, data and application owners, and system operators. Penetration testing provides valuable information regarding exploitable vulnerabilities in test, quality assurance, and production systems that may be used to bolster defenses and correct mistakes in the configuration of networks, applications, and systems. Penetration testing, however, can be costly due to the time and resources required to prepare and execute the test, and could be problematic due to the potential disruption or corruption of system. Highly trained experts are needed to play the role of ethical hackers who attempt to find security vulnerabilities. The ethical hackers may also have particular approaches or biases in their techniques, and may not be able to represent the myriad techniques of varying threats or adversaries (e.g., the techniques of state-sponsored actors compared to independent "basement" hackers).

Traditionally, it has also been very difficult to rapidly provide penetration testing results that keep up in pace with evolving cybersecurity threats. Due to the execution of penetration testing in real time with human actors, including human analysis of results and other manual steps, it is difficult to provide cost-effective rapid testing of security vulnerabilities. Furthermore, social engineering plays a prominent role in many real attacks and break-ins, which can be difficult to simulate accurately in penetration testing.

In contrast to these conventional techniques for penetration testing, example embodiments described herein use automated reinforcement learning (ARL) to build a computer agent that may perform penetration tests of computing systems which may be augmented with social engineering methods. In ARL, three components, an ARL policy, an ARL agent, and an ARL environment, are defined, which may use real or simulated systems to rapidly and repeatedly test and adapt an ARL policy to detect vulnerabilities in a computer system embedded in the ARL environment. Example embodiments may also use large language models (LLMs) to provide and/or carry out social engineering actions. The social engineering actions may be integrated into the ARL policy of the ARL agent processes so that a complete understanding of the linkage between social engineering and other methods may be understood.

In another embodiment using ARL, an LLM may receive an indication of various actions from the ethical hacker who is performing penetration testing and may serve as an assistant. The LLM may be able to provide recommendations consistent with previous actions taken even if the instructions as part of the penetration testing are not described explicitly. For example, the LLM may receive the ethical hacker's commands and use the inputs to prepare an initial policy or hyperparameters, an environment, etc. using ARL to train an ARL agent. In another embodiment, an LLM may be used to supplement the interaction to perform the penetration tests disclosed here.

Accordingly, the present disclosure sets forth systems, methods, and apparatuses that provide ARL for managing and applying the penetration testing or to a computer system. There are many advantages of these and other embodiments described herein. For instance, ARL may rapidly perform many iterations to test myriad vulnerabilities of a network, especially in instances in which the environment is simulated or isolated from production networks. Rapid testing may be used in a transfer learning capacity, for example, to rapidly train a penetration test ARL agent in a simulated environment and transfer the learning in stages to gradually more realistic environments. In addition, incorporating LLMs may add awareness of social engineering to the benefits described above. In a multi-staged transfer learning context, more realistic environments for social engineering methods may be gradually introduced, culminating in tests with real human agents both carrying out and responding to social engineering attempts, and/or using artificial intelligence avatars (e.g., generated audio and visual interactions) to carry out social engineering attempts.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Figure 1:
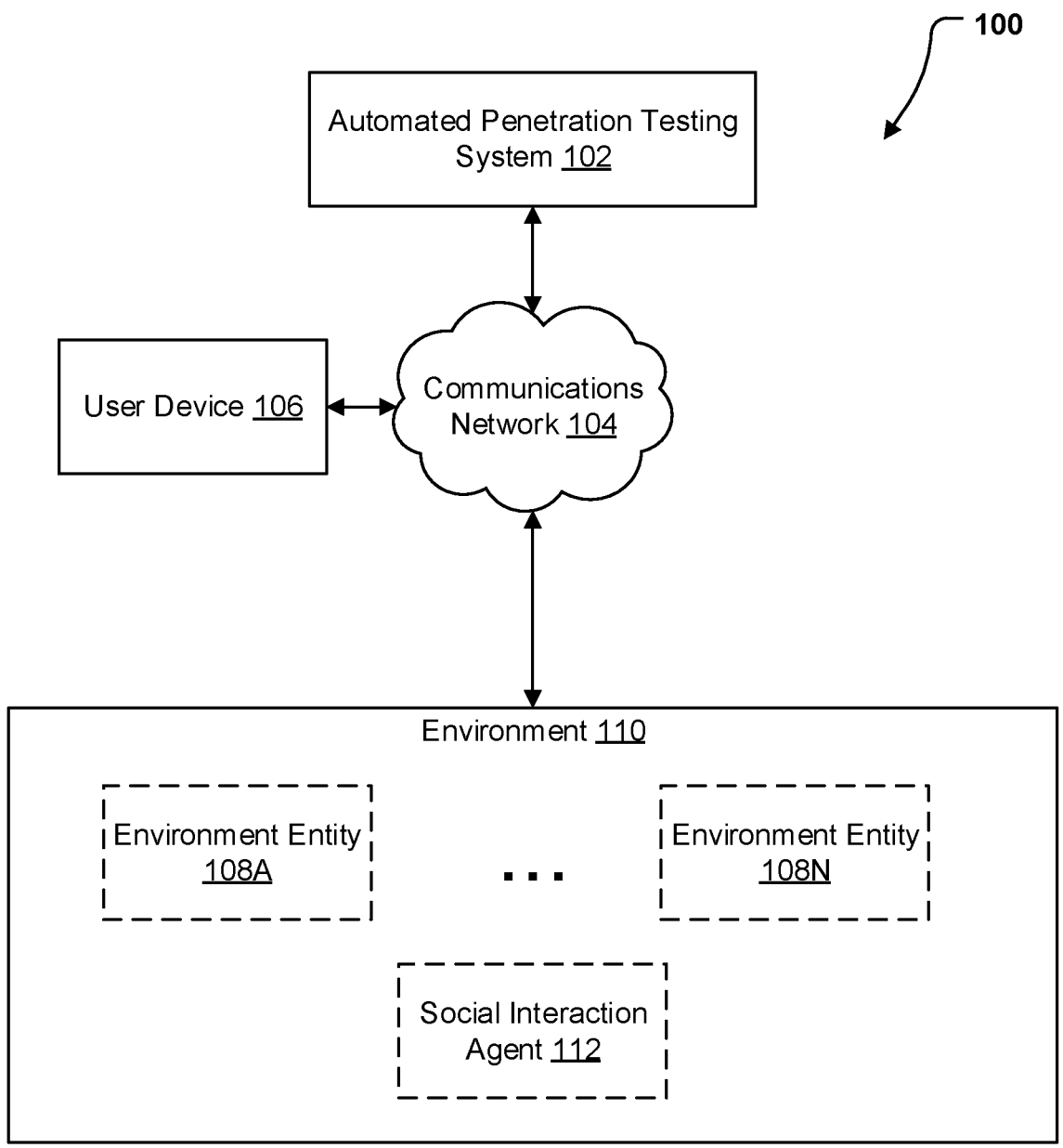
FIG. 1 illustrates a system in which some example embodiments may be used for determining a security vulnerability of a system.

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" refers to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" refers to any computing device capable of functioning as a server, such as a master exchange server, web server, mail server, document server, or any other type of server. A server may be a dedicated computing device or a server module (e.g., an application) hosted by a computing device that causes the computing device to operate as a server. In some embodiments, a server may be embodied as a virtual device, for example, as a process running on a virtual machine (VM). Additionally or alternatively, a server may be executed in a containerized environment. The term server, as used herein, may refer to any software process, including simulated environments, that are capable of functioning as a server within an ARL environment, real or virtual.

The term "agent" (or ARL agent) may refer to a hardware, firmware, or software entity that interacts with an environment, in the context of ARL. The agent may perform actions to cause a response in the environment, which in turn may enable an ARL system to achieve some objective. The agent may further perceive changes in the environment to report the changes back to the system as a state change of the environment. By executing various actions as directed by an ARL system, the agent may seek to maximize a pre-defined reward, thereby learning a policy for maximizing the reward. The agent may utilize an approach of trial and error, where its next actions are determined by a learning model included in the ARL system, and feedback from the agent's actions are reported back to the learning model (e.g., a deep neural network). The ARL agent mirrors a human penetration testing agent; the ARL agent may be trained automatically and provide insights to the human agent. In some embodiments, the agent may utilize an LLM or similar model to perform actions in the environment, report the results of actions, perceive changes in the environment, and/or the like.

The term "environment" may include the entire system or group of systems (e.g., a computer network, real or virtual) with which an agent may interact in the context of ARL. The environment may be external to the agent, and the environment may respond and change based on various actions executed by the agent, which may in turn be observed and recorded by agent circuitry. In the context of penetration testing, the environment may include a target of evaluation (TOE), which may be a network, segment, application, server, appliance, or the like.

In some embodiments, the environment may be the computer network in which the penetration testing is performed by the ARL agent. In some embodiments, the main task performed by the ARL agent in the environment to mitigate risk from the threat due to quantum computing. The objective may be to perform penetration testing to ensure that post-quantum cryptography (PQC) migration is performed. Constant interaction with the environment may allow autonomous learning by the agent.

The environment may be described using various states from a set of states. The set of states be a discrete set of states, or may be described by one or more continuous variables.

The term "reward" may be defined as a value assigned to a particular state of the environment used for training in ARL, where the agent attempts to maximize the cumulative reward through the series of actions. The rewards may be specified as constant, pre-determined values, in a functional form, or a hybrid of both approaches (e.g., some states use constant rewards while others use rewards as defined by functions). The rewards may indicate the desirability of various states of the environment to the user or designer, and may be used to incentivize the ARL process to move into a state with larger reward.

In some embodiments, the reward is proportional to the ease of exploiting the vulnerability. A rewarding scheme in this example relies on both the automated function and a penetration tester's feedback. This reward scheme may enable the ARL agent to maximize the long-term goal of reducing risk due to network vulnerabilities.

The term "policy" may refer to a matrix or other data structure that defines an action or actions to be taken for a particular state of an environment, and may be defined deterministically, stochastically, or a hybrid of both. The policy may start in an initialized state (for example, defaulting to a single action for any given state, or any other simple policy). The policy may evolve during the ARL process away from the initialized state and into an optimal policy. The ARL agent's expertise and learning are stored and constantly improved as reflected in the policy.

For a simplified example of a policy, an environment may exist in states A, B, or C, and the agent may be able to undertake actions X, Y, or Z. A policy may be represented as a matrix given by [[1,0,0],[0,1,0],[0,0,1]], which causes the agent to take action X when the environment is found in state A, action Y in state B, and action Z in state C. Note that taking action X, Y, and/or Z may subsequently change the state of the environment (which may in turn provide a reward) but the subsequent state may not necessarily be known or able to be determined before the action is performed (e.g., the environment may be non-deterministic). In a further example where the entries in the matrix are not each equal to 0 or 1, the agent may choose actions either probabilistically (for a stochastic policy) based on the values of each action corresponding to a given state, or may choose the action with the largest values (for a deterministic policy).

System Architecture

Example embodiments described herein may be implemented using any of a variety of computing devices or servers. To this end, FIG. 1 illustrates an example environment 100 within which various embodiments may operate. As illustrated, an automated penetration testing system 102 may receive and/or transmit information via communications network 104 (e.g., the Internet) with any number of other devices, such as user device 106 and/or environment entities 108A-108N.

The automated penetration testing system 102 may be implemented as one or more computing devices or servers, which may be composed of a series of components. Particular components of the automated penetration testing system 102 are described in greater detail below with reference to apparatus 200 in connection with FIG. 2.

The user device 106 and the one or more entities 108A-108N may be embodied by any computing devices known in the art. The user device 106 and the one or more environment entities 108A-108N need not themselves be independent devices, but may be peripheral devices communicatively coupled to other computing devices.

The environment 110 may be a real or simulated entity in which an agent may interact by performing actions and observing changes. The automated penetration testing system 102 may include an embodiment of an agent interacting within the environment 110. The environment 110 may be configured to resemble a computer network environment, wherein security vulnerabilities or other intelligence may be gathered about the computer network environment. For example, the environment 110 may be a replica, simulated or real, of an actual network including user terminals, web servers, mail servers, cloud devices, printers, wireless access points, and/or the like. The one or more environment entities 108A-108N, which may themselves be simulated or real devices, software applications, or the like, may be chosen to embody the various devices in the environment 110 that correspond to the devices of the actual network.

In some embodiments, the environment 110 may include special-purpose communications backchannels to provide state information to the automated penetration testing system 102 independently of an agent's interactions within the environment 110. For example, the agent may collect intelligence, which may be limited or imperfect, by taking actions within the environment 110, and the automated penetration testing system 102 may independently maintain total knowledge using communications backchannels to guide the training of the agent and accurately determine the state of the environment 110.

In some embodiments, a social interaction agent 112 may carry out various social interactions within the environment 110. In embodiments in which the environment 110 is simulated, the social interaction agent 112 may simulate social interactions using LLMs or other techniques. In embodiments in which an environment 110 includes human or simulated human agents or operators of the network, the social interaction agent may take one of a variety of forms. For example, the social interaction agent may use voice synthesis with an LLM to mimic a human voice and place voice and/or video calls to various human or simulated agents interacting with the environment 110. In some embodiments, the social interaction agent 112 may provide a script to a human operator who may carry out the social interaction script. The human operator may be tasked with performing operation such as placing phone or video calls, making visits to physical locations such as bank branches or ATMs, and/or the like.

Example Implementing Apparatuses

Figure 2:
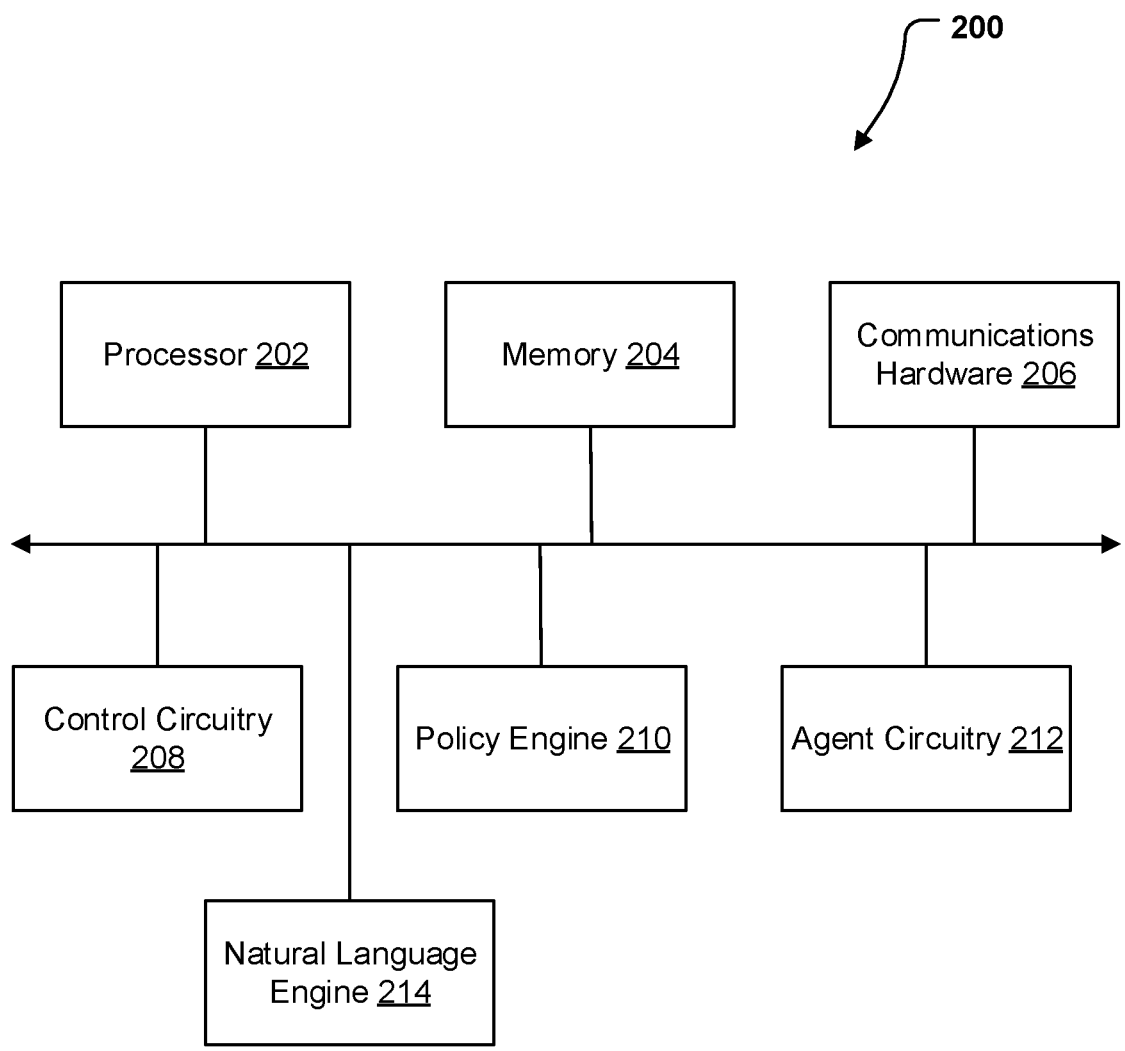
FIG. 2 illustrates a schematic block diagram of example circuitry embodying a system device that may perform various operations in accordance with some example embodiments described herein.

The automated penetration testing system 102 (described previously with reference to FIG. 1) may be embodied by one or more computing devices or servers, shown as apparatus 200 in FIG. 2. The apparatus 200 may be configured to execute various operations described above in connection with FIG. 1 and below in connection with FIGS. 3A-3B. As illustrated in FIG. 2, the apparatus 200 may include processor 202, memory 204, communications hardware 206, control circuitry 208, policy engine 210, agent circuitry 212, and natural language engine 214 each of which will be described in greater detail below.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor. In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processing circuitry for causing transmission of such signals to a network or for handling receipt of signals received from a network.

The communications hardware 206 may further be configured to provide output to a user and, in some embodiments, to receive an indication of user input. In this regard, the communications hardware 206 may comprise a user interface, such as a display, and may further comprise the components that govern use of the user interface, such as a web browser, mobile application, dedicated client device, or the like. In some embodiments, the communications hardware 206 may include a keyboard, a mouse, a touch screen, touch areas, soft keys, a microphone, a speaker, and/or other input/output mechanisms. The communications hardware 206 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises a control circuitry 208 that initializes and updates a policy, receives state information and determines rewards, and causes iteration and/or termination of the ARL process. The control circuitry 208 may utilize processor 202, memory 204, or any other hardware component included in the apparatus 200 to perform these operations, as described in connection with FIGS. 3A-4 below. The control circuitry 208 may further utilize communications hardware 206 to gather data from a variety of sources (e.g., user device 106 FIG. 1), and/or exchange data with a user, and in some embodiments may utilize processor 202 and/or memory 204 to configure and guide the ARL process.

In addition, the apparatus 200 further comprises a policy engine 210 that determines an action to perform when given a state of the environment 110. The policy engine 210 may utilize processor 202, memory 204, or any other hardware component included in the apparatus 200 to perform these operations, as described in connection with FIGS. 3A-4 below. The policy engine 210 may further utilize communications hardware 206 to gather data from a variety of sources (e.g., user device 106 or environment entities 108A-108N, as shown in FIG. 1), and/or exchange data with a user, and in some embodiments may utilize processor 202 and/or memory 204 to determine actions based on states of an environment.

As described previously, the ARL process includes a policy that determines an action based on a state. The policy engine 210 may be an embodiment of the policy, and may maintain, update, format, log, and perform other various actions directly related to the policy. The policy of the policy engine 210 may be an actual tabular matrix, a deep neural network, a combination of neural networks and control systems, or any form of policy known in the art. In some embodiments, the policy engine 210 may provide an application programming interface (API) with which other circuitry of the apparatus 200 may interact to determine actions, process rewards, communicate states of the environment 110, or the like.

Further, the apparatus 200 further comprises an agent circuitry 212 that executes an action in the environment 110. The agent circuitry 212 may utilize processor 202, memory 204, or any other hardware component included in the apparatus 200 to perform these operations, as described in connection with FIGS. 3A-4 below. The agent circuitry 212 may further utilize communications hardware 206 to gather data from a variety of sources (e.g., user device 106 or environment entities 108A-108N and social interaction agent 112 in environment 110, as shown in FIG. 1), and/or exchange data with a user, and in some embodiments may utilize processor 202 and/or memory 204 to interact with the environment 110.

In the context of ARL, the term "agent" may refer to any entity that interacts with an environment. The agent may perform actions to cause a response in the environment, which in turn may enable an ARL system to achieve some objective. The agent may further perceive changes in the environment to report the changes back to the system as a state change of the environment. By executing various actions as directed by an ARL system, the agent may seek to maximize a pre-defined reward, thereby learning a policy for maximizing the reward. The agent may utilize an approach of trial and error, where its next actions are determined by a learning model included in the ARL system, and feedback from the agent's actions are reported back to the learning model (e.g., a deep neural network).

The agent circuitry 212 may be an embodiment of an agent in the ARL sense, and may include specialized hardware such as processors, network interfaces, and/or the like for interacting with the particular environment 110. The agent circuitry 212 may further include specialized hardware and/or may be loaded with firmware or software such as network protocols, scripts, applications, and/or the like for sending and receiving communications within the environment 110. In some embodiments, the agent circuitry 212 may send and receive communications via the communications hardware 206, and may utilize a particular channel, protocol, tunnel, and/or the like of the communications hardware 206 for the purposes of interacting in the environment 110.

Further, the apparatus 200 further comprises a natural language engine 214 that prepares a social engineering script. The natural language engine 214 may utilize processor 202, memory 204, or any other hardware component included in the apparatus 200 to perform these operations, as described in connection with FIGS. 3A-4 below. The natural language engine 214 may further utilize communications hardware 206 to gather data from a variety of sources (e.g., user device 106 or environment entities 108A-108N and social interaction agent 112 in environment 110, as shown in FIG. 1), and/or exchange data with a user, and in some embodiments may utilize processor 202 and/or memory 204 to interact with the environment 110.

The natural language engine 214 may include language models, such as a large language model (LLM). LLMs are natural language processing models trained on vast amounts of data using deep learning, and may typically use transformers, an architecture of deep learning models using a parallel multi-head attention mechanism. The LLM is typically pre-trained using unsupervised learning with a large collection of written text in a particular language. In some embodiments, the LLM may be further trained using transfer learning, where in an initial stage is trained using a large, general purpose database of written text and a specialization stage is performed to add additional training in a subject matter area (e.g., social engineering, a knowledge domain related to the business purpose of the computer network under investigation, etc.). The LLM may accept a prompt as input and provide text output in a sequential manner, predicting the next word in a sequence based on the prompt and the currently generated response. The LLM may include a sophisticated use of grammar, idioms, and domain-based knowledge that is able to closely imitate the communication patterns of human writers or speakers.

Although components 202-214 are described in part using functional language, it will be understood that the particular implementations necessarily include the use of particular hardware. It should also be understood that certain of these components 202-214 may include similar or common hardware. For example, the control circuitry 208, policy engine 210, agent circuitry 212, and natural language engine 214 may each at times leverage use of the processor 202, memory 204, or communications hardware 206, such that duplicate hardware is not required to facilitate operation of these physical elements of the apparatus 200 (although dedicated hardware elements may be used for any of these components in some embodiments, such as those in which enhanced parallelism may be desired). Use of the terms "circuitry" and "engine" with respect to elements of the apparatus therefore shall be interpreted as necessarily including the particular hardware configured to perform the functions associated with the particular element being described. Of course, while the terms "circuitry" and "engine" should be understood broadly to include hardware, in some embodiments, the terms "circuitry" and "engine" may in addition refer to software instructions that configure the hardware components of the apparatus 200 to perform the various functions described herein.

Although the control circuitry 208, policy engine 210, agent circuitry 212, and natural language engine 214 may leverage processor 202, memory 204, or communications hardware 206 as described above, it will be understood that any of control circuitry 208, policy engine 210, agent circuitry 212, and natural language engine 214 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or communications hardware 206 for enabling any functions not performed by special-purpose hardware. In all embodiments, however, it will be understood that control circuitry 208, policy engine 210, agent circuitry 212, and natural language engine 214 comprise particular machinery designed for performing the functions described herein in connection with such elements of apparatus 200.

In some embodiments, various components of the apparatus 200 may be hosted remotely (e.g., by one or more cloud servers) and thus need not physically reside on the corresponding apparatus 200. For instance, some components of the apparatus 200 may not be physically proximate to the other components of apparatus 200. Similarly, some or all of the functionality described herein may be provided by third party circuitry. For example, a given apparatus 200 may access one or more third party circuitries in place of local circuitries for performing certain functions.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, DVDs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatus 200, example embodiments are described below in connection with a series of flowcharts.

Example Operations

Figure 3A:
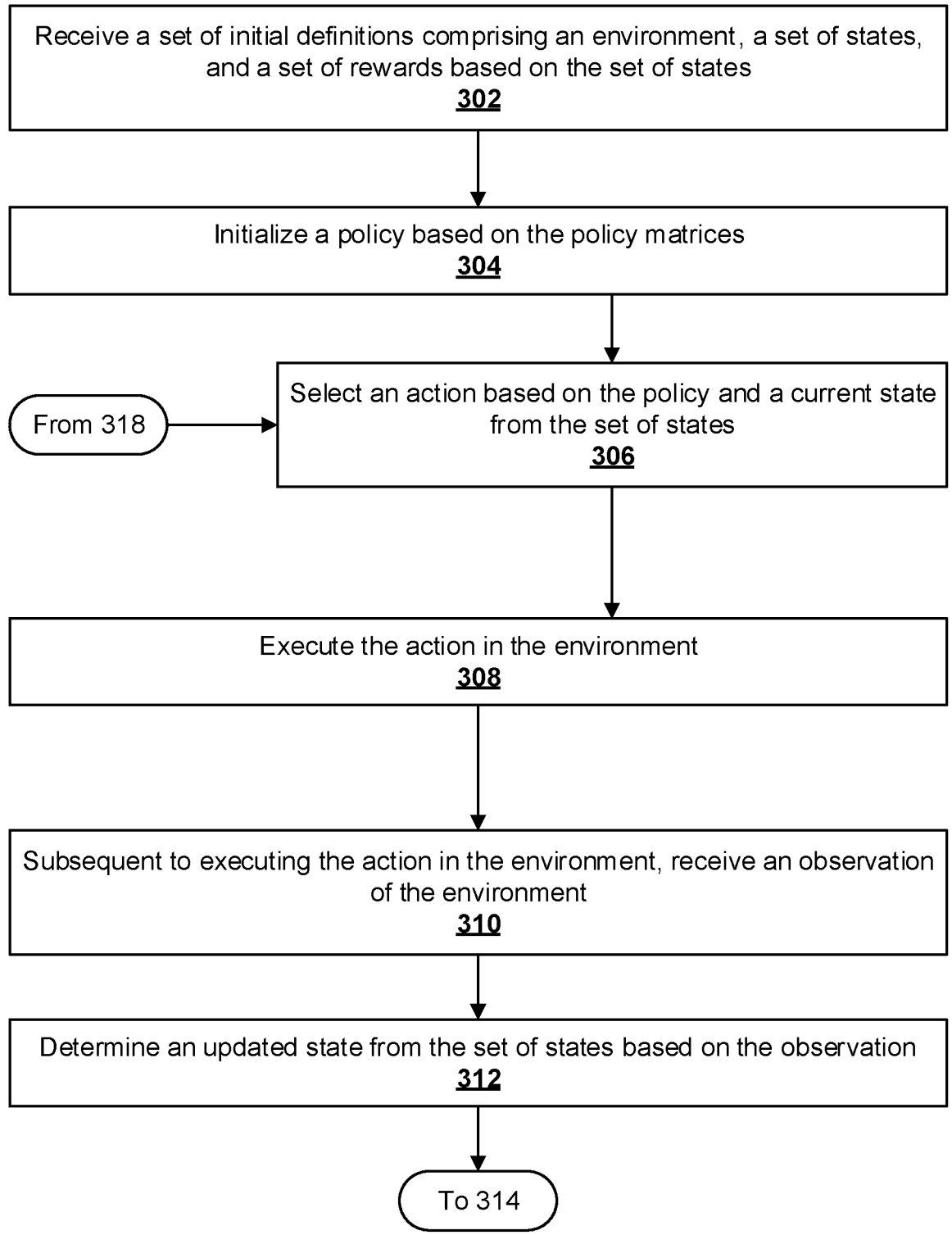
FIGS. 3A and 3B illustrate an example flowchart for determining a security vulnerability of a system, in accordance with some example embodiments described herein.
Figure 3B:
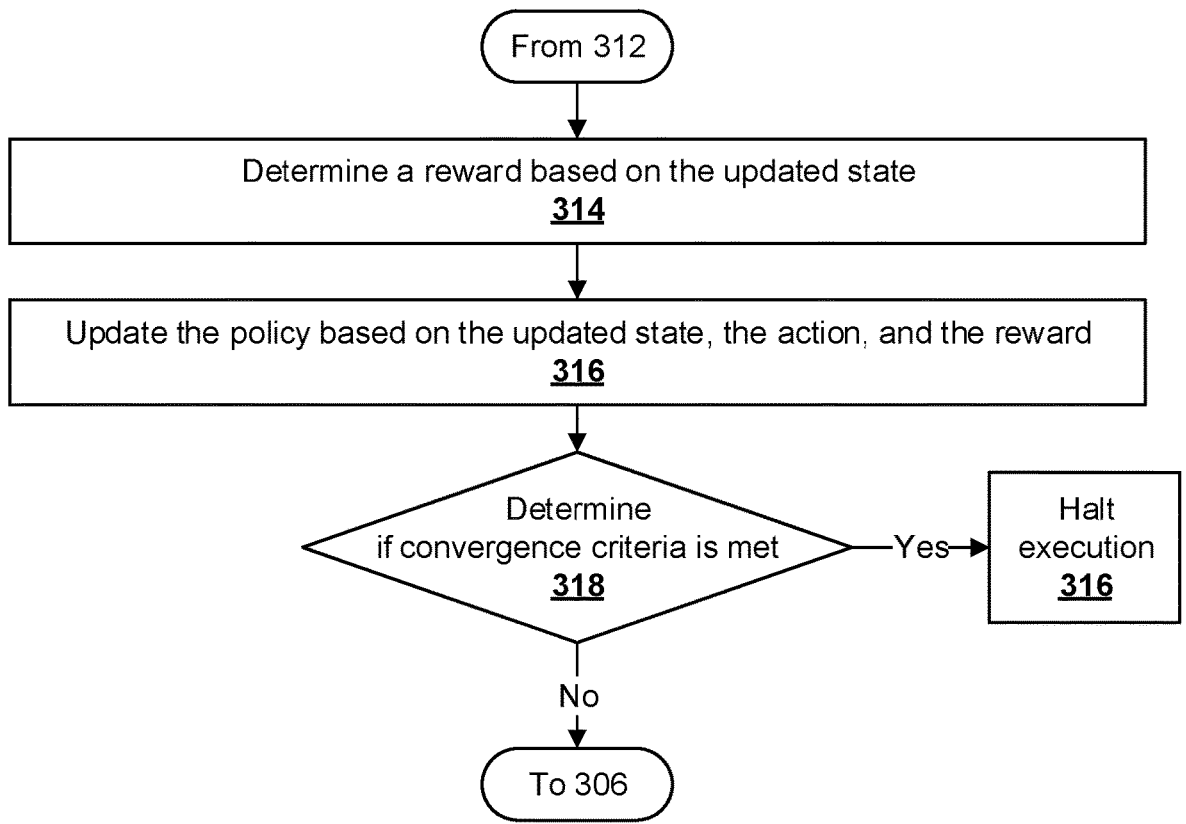
Figure 4:
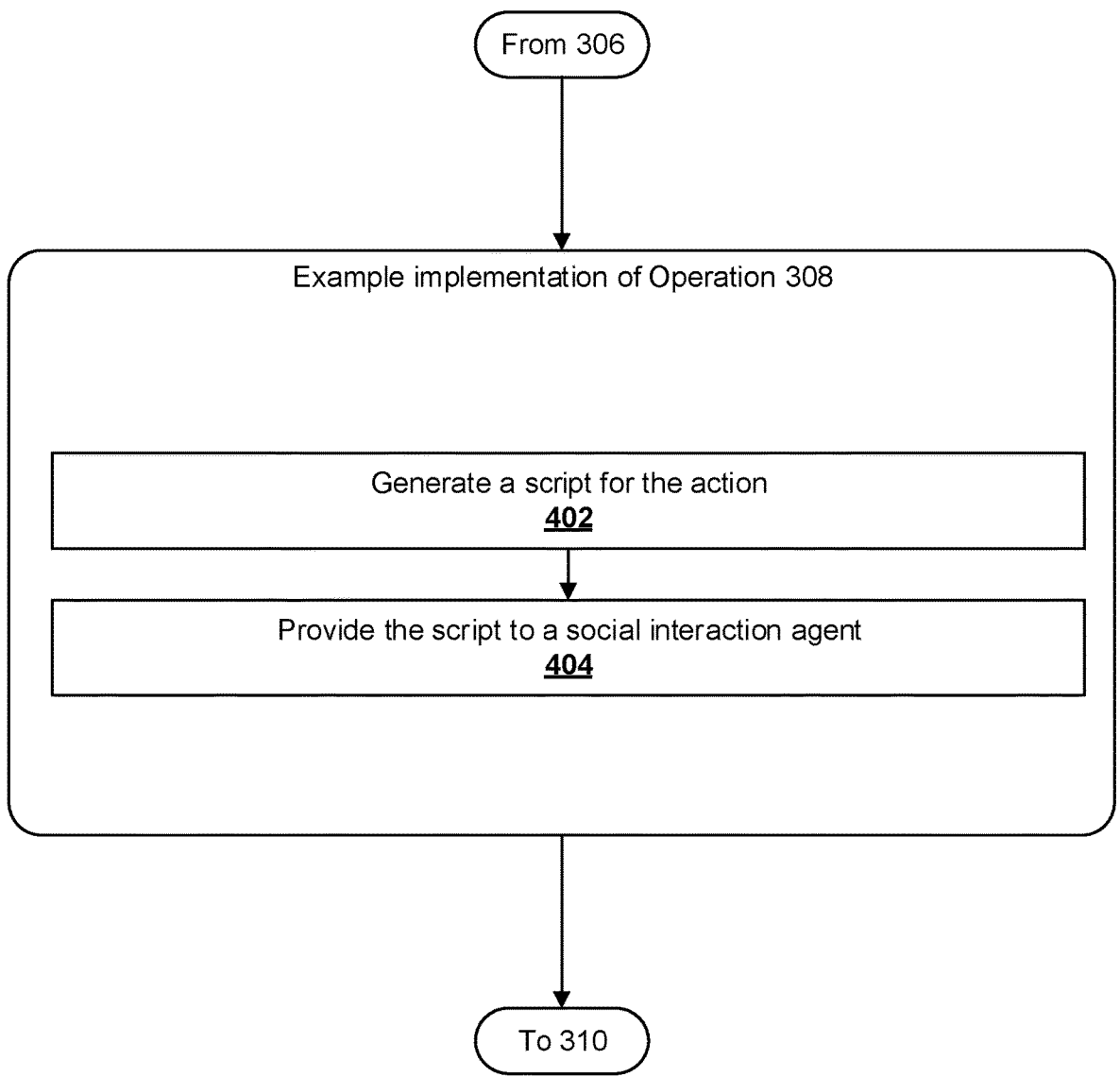
FIG. 4 illustrates an example flowchart for executing a social engineering action in an environment, in accordance with some example embodiments described herein.

Turning to FIGS. 3A, 3B, and 4, example flowcharts are illustrated that contain example operations implemented by example embodiments described herein. The operations illustrated in FIGS. 3A-4 may, for example, be performed by the automated penetration testing system 102 shown in FIG. 1, which may in turn be embodied by an apparatus 200, which is shown and described in connection with FIG. 2. To perform the operations described below, the apparatus 200 may utilize one or more of processor 202, memory 204, communications hardware 206, control circuitry 208, policy engine 210, agent circuitry 212, natural language engine 214, and/or any combination thereof. It will be understood that user interaction with the automated penetration testing system 102 may occur directly via communications hardware 206, or may instead be facilitated by a separate user device 106, as shown in FIG. 1, and which may have similar or equivalent physical componentry facilitating such user interaction.

Turning first to FIG. 3A, example operations are shown for determining a security vulnerability of a system. As shown by operation 302, the apparatus 200 includes means, such as memory 204, communications hardware 206 or the like, for receiving a set of initial definitions comprising an environment, a set of states, and a set of rewards based on the set of states. In some embodiments, the set of initial definitions may further include policy initialization data, wherein the set of policy initialization data comprises a set of actions, wherein the set of actions comprises a social hacking method. The communications hardware 206 may receive the set of initial definitions via network connection (e.g., from a remote server such as user device 106). In some embodiments, the memory 204 may store the set of initial definitions, and/or a user may input initial definitions via the communications hardware 206.

The set of initial definitions may define parameters and instructions for executing an ARL technique. The set of initial definitions may be stored and/or received in any format known in the art, including binary data, plain text data, structured text, or the like. The set of initial definitions may further include various hyperparameters used to train and execute the ARL model. The set of initial definitions may further include various operational settings, such as file locations, network configurations, debug settings, and/or other configurations needed for the apparatus 200 to train and execute the ARL model.

The environment (embodied by environment 110) may include the entire system with which the agent (embodied by agent circuitry 212) may interact to determine a security vulnerability of a system. The environment 110 may be external to the automated penetration testing system 102, and the environment 110 may respond and change based on various actions executed by agent circuitry 212, which may in turn be observed and recorded by agent circuitry 212 and/or communications hardware 206.

The environment 110 may be described using various states from a set of states. The states from the set of states may be finite, such as a discrete set of states, or may be infinite, such as a state described by a continuous variable or a discrete state with infinitely many potential configurations. The states may be understood and ingested by the apparatus 200 in the form of a data structure, for example, by describing any number of variables or possible discrete configurations within the environment 110. For example, in the context of network security the set of states for an environment 110 may include port listings and statuses, presence or absence of various software applications, an indication of whether an attacker has accessed various information on the network, and/or the like.

The set of initial definitions may also include a set of rewards corresponding to the set of states. The rewards may be defined in a functional form (e.g., a reward function), as specified values, or a hybrid of both approaches. The rewards may indicate the desirability of various states of the environment 110, and may be used to incentivize the automated penetration testing system 102 to move the environment 110 into a state with larger reward. In some embodiments, the set of rewards may be described by a reward function that encourages gaining access to a specified computing device. In other words, the reward function may provide a large score for actions that cause the agent to read or write files or other machine state information from a pre-determined environment entity 108A within the environment 110. For example, a particular environment entity 108A may be designated as a target, and the ultimate objective of the automated penetration testing system 102 is to access the target host.

The set of initial definitions may also include policy initialization data. The policy may be a matrix or other data structure that defines an action or actions to be taken for a particular state of an environment, and may be defined deterministically, stochastically, or a hybrid of both. The policy may start in an initialized state (for example, defaulting to a single action for any given state, or any other simple policy). The policy may evolve during the ARL process away from the initialized state and into an optimal policy.

For a simplified example of a policy, an environment may exist in states A, B, or C, and the agent may be able to undertake actions X, Y, or Z. A policy may be represented as a matrix given by [[1,0,0],[0,1,0],[0,0,1]], which causes the agent to take action X when the environment is found in state A, action Y in state B, and action Z in state C. Note that taking action X, Y, and/or Z may subsequently change the state of the environment (which may in turn provide a reward) but the subsequent state may not necessarily be known or able to be determined before the action is performed (e.g., the environment may be non-deterministic). In a further example where the entries in the matrix are not each equal to 0 or 1, the agent may choose actions either probabilistically (for a stochastic policy) based on the values of each action corresponding to a given state, or may choose the action with the largest values (for a deterministic policy).

In other embodiments, the policy initialization data may be initial values describing a deep neural network or other artificial intelligence model that determines an action based on an input state. For a deep neural network-based policy matrix (also called, more generally, deep reinforcement learning) the output of the neural network may be used in a stochastic or deterministic way, depending on whether the output of the deep neural network policy is used to probabilistically generate an action, or whether the most probable output action is chosen deterministically.

In some embodiments, the set of states may be represented using a set of knowledge graphs. For example, the knowledge graph may include nodes and subject-object relationships between nodes. Nodes may represent entities such as networked devices, applications, protocols, and/or the like. The relationships between nodes may indicate, for example, a network connection between devices, an application being installed on a particular system, or a protocol used by a particular networked device. The knowledge graph may be a convenient data structure for representing the state of the environment 110, and may offer the additional benefit of being comprehensible to a human reviewing the state of the environment 110. The knowledge graph may also provide a data source to an LLM which has been trained to provide more current information in an additive manner versus having to retrain an LLM, which is a time consuming process to reduce hallucinations and inaccuracies with past entity states.

The set of initial definitions may also include a set of actions referenced in the policy initialization data. The set of actions may indicate ways in which the agent (embodied by agent circuitry 212) may interact with the environment 110. For example, in a network security context, the agent circuitry 212 may take actions including making login attempts, pinging network devices, polling ports, executing various scripts, and/or the like. Generally, performing actions may cause changes in the environment 110, which may be reflected in a change of the state of the environment 110 (described by one of the states from the set of states). The set of actions that the agent circuitry 212 may take may be defined to narrow or broaden the scope of the ARL process, where a larger set of actions may enable more flexibility but may make training slower. The selection of an appropriate set of actions may be critical for ensuring convergence of the ARL process.

In some embodiments, the set of actions may also include various social engineering methods. In some embodiments, the social engineering methods may be carried out by a specialized entity called the social interaction agent 112. The social interaction agent 112 may execute the action corresponding to a social engineering method, and the social interaction agent 112 may report certain results back to the apparatus 200 which may supplement the observation of the environment state determined by the agent circuitry 212. As described previously, the social interaction agent may be an LLM or application that utilizes an LLM to perform a social interaction with a system, and in some embodiments, the social interaction agent 112 may be an interface to a human agent who may carry out various social engineering scripts as determined by the automated penetration testing system 102.

In some embodiments the apparatus 200 may provide the social engineering script to the human agent. The human agent may then carry out the actions dictated by the social engineering script. The human agent may subsequently provide an indication of the result of the social engineering actions to the apparatus 200, for example, using a specialized interface including a form or other user interface. In some embodiments, the agent circuitry 212 and or natural language engine 214 may include various sensors such as microphones and/or cameras for receiving data and/or providing data to the human agent in real time. For example, a human agent may visit a physical location to provide personal details to attempt to access an account, and the natural language engine 214 may receive details of the conversation which may in turn be used to generate subsequent LLM prompts, and the results may be provided to the human agent.

In some embodiments, the automated penetration testing system 102 may initially use a set of actions that does not include social engineering actions, and the automated penetration testing system 102 may be trained using the limited set of actions. Subsequently, the automated penetration testing system 102 may use the training with the limited set of actions and continue training with an expanded set of actions that may include one or more social engineering methods. By using the social engineering methods in a second stage of training as described in the previous example, the automated penetration testing system 102 may limit the number of iterations spent searching in the policy space including social engineering actions, which may accelerate the process of convergence on an acceptable solution.

As shown by operation 304, the apparatus 200 includes means, such as processor 202, memory 204, control circuitry 208, policy engine 210, agent circuitry 212, or the like, for initializing a policy. In some embodiments, the policy may be initialized based on the policy initialization data received in operation 302. The policy may be embodied by policy engine 210. The control circuitry 208 may initialize a policy by copying or transferring the policy initialization data from the set of initial definitions received in operation 302, or the policy may be initialized procedurally (e.g., initializing values to zero or random quantities). The control circuitry 208 may further initialize, configure, load, and/or perform other actions to prepare the agent circuitry 212 to undertake the actions defined by the policy and selected by the policy engine 210. For example, the control circuitry 208 may acquire software libraries, scripts, applications, and/or the like to load and install onto the agent circuitry 212.

In some embodiments, the control circuitry 208 may additionally initialize the environment 110 based on the set of initial definitions received in operation 302. For example, in some embodiments the environment 110 may be a simulated environment, and the control circuitry 208 may initialize a new virtual machine or other virtual environment to embody the environment 110. In some embodiments, the control circuitry 208 may cause various environment entities 108A-108N to be initialized into an initial state to reset the environment 110, for example, by formatting storage devices, initializing network configurations, installing operating systems, and/or the like.

In some embodiments, the policy embodied by the policy engine 210 may be a deep neural network, and the deep neural network may be initialized based on policy initialization data from the set of initial definitions. For example, the policy initialization data may be a traditional tabular matrix, and may be used to initialize certain parameters of the deep neural network. In some embodiments, the policy initialization data may be a trained deep neural network, which may or may not have identical structure as the policy, and may be used to initialize the policy.

In some embodiments, the policy engine 210 may include a control system distinct from a neural network controlled by the policy engine 210. For example, to improve interpretability of a deep reinforcement learning system, a policy may include more traditional controls that dictate how an agent interacts with an environment 110 in addition to a deep learning component. A deep neural network may be embedded within the policy that, instead of directly choosing actions to interact with the environment 110, may instead choose ways to manipulate the controls within the policy. The control system may be designed to be interpretable and/or comprehensible to a human expert interacting with the environment 110. In some embodiments, the agent circuitry 212 may be directly driven by the control system embedded in the policy engine 210.

In some embodiments, initializing the policy may include using an initial policy based on behavior profiles one or more known groups, where the known groups refer to various actors linked to cybersecurity attacks. For example, a policy may be initialized based on observations and assumptions designed to mimic resources, patterns, knowledge, sophistication, and/or the like related to a state-sponsored cyberattack, which are organized and compiled into a report known as a behavior profile. Another example policy may be initialized based on a behavior profile of known group of independent hackers. Known groups' behavior profiles may mimic specific real life groups, or capture patterns known from various time periods, geographic regions, styles of attack, sponsorship, and/or the like. Data related to known groups may be collected by various cybersecurity intelligence organizations and disseminated as behavior profiles for security purposes. The data used to determine behavior profiles of known groups may be proprietary or open source. The data used to determine patterns of known groups may be filtered, cleaned, reorganized, and otherwise reformatted to construct policy initialization data using techniques described above for initializing the policy of the policy engine 210.

As shown by operation 306, the apparatus 200 includes means, such as processor 202, memory 204, policy engine 210 or the like, for selecting an action based on a current state from the set of states and the set of rewards. The policy engine 210 may ingest the current state of the environment 110, which may be provided by the control circuitry 208. The policy engine may utilize the policy to determine an action based on the current state from the set of states. In some embodiments, the agent circuitry 212 may determine the current state of the environment 110, which may be ultimately provided to the policy engine 210. The policy engine 210 may take the current state of the environment 110 as an input, which may be reformatted or otherwise cleaned to provide a valid input to the policy engine 210.

As discussed previously, the policy (embodied by the policy engine 210) may be any form of policy known in the art, including a traditional tabular policy or a deep neural network policy. The policy in any form may receive the current state of the environment 110 as input and provide an action selected from the set of actions as an output. In some embodiments, the policy engine 210 may provide a plurality of actions, or may provide a probability distribution, where a probability is assigned to each action. The policy engine 210 may select the most probably or most highly-scored action or may use a stochastic method and select an action randomly from among the outputs of the policy, weighted according to the score or probability of each action.

As shown by operation 308, the apparatus 200 includes means, such as processor 202, memory 204, communications hardware 206, control circuitry 208, policy engine 210, agent circuitry 212, natural language engine 214, or the like, for executing, by agent circuitry, the action in the environment. In an instance in which the action is a social engineering method, operation 308 may be performed in accordance with the example operations shown in FIG. 4.

The agent circuitry 212 may execute the action determined by the policy engine 210 using any executable code, scripts, applications, tools, or other operations known in the art. In the context of network security, the agent circuitry 212 may gather intelligence, scanning network entities such as ports and service. The agent circuitry 212 may also use tools to determine known network vulnerabilities of network entities, and gather information on known services running on a network host. The agent circuitry 212 may also attempt to exploit vulnerabilities of a host, using actions such as types of password cracking or leveraging various vulnerabilities of a network host. The agent circuitry 212 may take action to gain and/or maintain privileged access to a compromised network host. The agent circuitry 212 may also attempt to exploit vulnerabilities such as wireless network access insecure web-based access, SQL injection, cross-site scripting, and/or the like. The agent circuitry 212 may further take actions that are social engineering actions, which are described below.

Turning now to FIG. 4, example operations are shown for executing a social engineering action in an environment. As shown by operation 402, the apparatus 200 includes means, such as processor 202, memory 204, communications hardware 206, control circuitry 208, policy engine 210, agent circuitry 212, natural language engine 214, or the like, for generating a script for the action. The agent circuitry 212 may utilize the natural language engine 214 to generate the script, and the natural language engine 214 may include various models for generating language output, such as an LLM (as described previously in connection with the natural language engine 214). In some embodiments, the agent circuitry 212 may be configured to provide various prompts, or several sentence-long text communications, which may include formatting or standardization, to the LLM.

For example, the agent circuitry 212 may be directed to take an action to attempt to access account information via a phone call using a particular collection of data. An example prompt may be "Suppose I am making a phone call to a bank and I need to make a withdrawal. After waiting, an agent greets me by saying 'Good morning, how may I help you?' Please generate one or two sentences I may say in response. Assume I only have access to the following personal information: {name: Example Name, phone: 123-4567-890, name of first pet: Rover}." In some embodiments, various aspects of the prompt may be determined by elements of the policy (embodied by the policy engine 210), such as the example personal information shown in the above example, the previous statement made by the agent, and/or the like.

As shown by operation 404, the apparatus 200 includes means, such as processor 202, memory 204, communications hardware 206, control circuitry 208, policy engine 210, agent circuitry 212, natural language engine 214, or the like, for providing the script to a social interaction agent 112. The natural language engine 214 may clean and/or format the script before providing the script to the social interaction agent 112. For example, an LLM may provide a script that begins with introductory or concluding text such as "Here are some sentences you may use in response to the agent's greeting you provided" which may be removed by the natural language engine 214. The natural language engine 214 may then provide the script and/or may use communications hardware 206 to transfer the script to the social interaction agent 112.

Returning to FIG. 3A, as shown by operation 310, the apparatus 200 includes means, such as processor 202, memory 204, communications hardware 206, agent circuitry 212, or the like, for subsequent to executing the action in the environment, receiving an observation of the environment. The apparatus 200 may receive the observation of the environment, which may be recorded by communications hardware 206 and/or agent circuitry 212. The communications hardware 206 and/or agent circuitry 212 may take various metrics of the environment 110 such as querying the status of devices, testing connectivity, determining lists of available services, and/or the like. The communications hardware 206 and/or agent circuitry 212 may also passively receive information about the environment 110, wherein the environment 110 may be configured to provide various metrics to the communications hardware 206 and/or agent circuitry 212. In some embodiments, metrics received passively by the communications hardware 206 and/or agent circuitry 212 may be transmitted by a specialized channel, so that environment observations are not intermixed or contaminated with actions and related intelligence performed and collected in the environment 110 as part of the ARL procedure.

As shown by operation 312, the apparatus 200 includes means, such as processor 202, memory 204, communications hardware 206, control circuitry 208, policy engine 210, agent circuitry 212, or the like, for determining, by the policy engine, an updated state from the set of states based on the observation. The control circuitry 208 or policy engine 210 may use observations made during operation 310 to determine an updated state from the set of states. The observations may be collected, formatted, or transformed to provide an updated state in the form used by the policy engine 210 to determine actions. For example, raw output of a terminal command to determine the status of a hardware device may be parsed and relevant information may be taken and placed into a JSON or other structured text file to form a representation of the updated state. In some embodiments, the observation may be formatted as an updated knowledge graph, which may be subsequently used to update the known state of the environment (which may also be stored as a knowledge graph).

Turning now to FIG. 3B, as shown by operation 314, the apparatus 200 includes means, such as processor 202, memory 204, communications hardware 206, control circuitry 208, policy engine 210, or the like, for determining a reward based on the updated state. The reward value may be determined using the control circuitry 208 and/or policy engine 210, and the reward may be stored (e.g., using memory 204) in connection with the current state and recent action for training of the policy determined by the policy engine 210. The reward may be determined, for example, using a lookup table or a reward function that provides a reward value based on an input state. The processor 202 may calculate the reward function value or search for the reward value stored in the lookup table using memory 204.

In some embodiments, a cumulative reward may also be stored using the memory 204. The reward determined in operation 314 may be added to (or subtracted from, for a negative reward) the cumulative reward total stored in memory 204. In some embodiments, the action-observation-reward cycle may continue for a pre-determined number of iterations, or until the environment 110 is found in an end state (e.g., by returning to operation 306). After the pre-determined number of iterations or the end state, the method may proceed to operation 316, where the environment 110 and the cumulative reward may be reset and another loop of action-observation-reward cycles may be performed (e.g., also by returning to operation 306 with the updated policy). It will be understood that, although some example operations and embodiments described herein refer to only a single iteration or loop, an arbitrary number of iterations or loops may be performed to allow the policy engine 210 to converge on an optimal policy.

As shown by operation 316, the apparatus 200 includes means, such as processor 202, memory 204, communications hardware 206, control circuitry 208, policy engine 210, or the like, for updating the policy based on the updated state, the action, and the reward. The control circuitry 208 may update the policy (embodied by the policy engine 210) using any training or learning method known in the art. For example, in embodiments in which the policy engine 210 uses deep neural networks, the control circuitry 208 may use back-propagation to determine the gradients of a loss function with respect to parameters of the policy engine 210 and perform a gradient descent optimization (or another mathematical optimization algorithm). Various pre-determined hyperparameters may influence the particular details of the learning process, which may be determined using a settings or configuration file prior to starting execution of the ARL process. Parameters such as the learning rate may also be updated based on the gradients determined during back-propagation.

In some embodiments, the policy may not use deep neural networks, and may instead use a traditional tabular matrix policy. The control circuitry 208 may utilize any of a number of strategies to update a traditional, non-AI policy, such as a greedy policy to choose actions with the highest estimated reward value, or updates that occasionally add a random element to explore non-greedy policies.

The control circuitry 208 may consider all information collected by various components of the apparatus 200, including the updated state, the action, the reward, and stored states, actions, and rewards from previous iterations of the process. The control circuitry 208 may update or perturb the various parameters of the policy engine 210 to generate an updated policy. In some embodiments, the control circuitry 208 may only cause an update to the policy after the agent circuitry 212 has iterated a sufficient number of actions within the environment 110 to find a cumulative reward, based on pre-determined configuration settings.

As shown by decision block 318, control may flow to operation 306 or operation 316 depending on a determination of whether a convergence criterion is met. In an instance in which the convergence criterion is met, control may flow to operation 316. In an instance in which the convergence criterion is not met, control may flow to operation 306. The convergence criteria may be any condition on the parameters of the ARL process. For example, a convergence criteria may be imposed when a gradient descent algorithm (or other optimization algorithm) determines that an extremum of the cost function has been reached within a pre-determined margin of error. An additional convergence criteria may impose a maximum number of iterations of the ARL process, preventing the learning from looping infinitely.

In some embodiments, a user may specify a convergence criterion when configuring the control circuitry 208 before beginning execution. The determination of the convergence criterion may, additionally or alternatively, be received from communications hardware 206 during operation 302 as part of the initial definitions. The selection of the convergence criterion or convergence criteria may depend on the available time and resources for the ARL process and/or the estimated and/or actual time and resources required for each iteration of the ARL process. The convergence criterion may be assessed and used automatically to determine whether to proceed to operation 316, or in some embodiments, a user may manually intervene and terminate operation when the user has determined a sufficient number of iterations of the ARL process have been executed.

As shown by operation 316, the apparatus 200 includes means, such as processor 202, memory 204, control circuitry 208, or the like, for halting execution. Execution may be halted when a convergence criterion is reached, a maximum number of iterations is reached, an error state occurs, and/or other specified conditions occur. The control circuitry 208 may finalize the ARL process and commit variables and parameters such as the active state, parameters of the policy engine 210, and the like to long-term storage in memory 204. In some embodiments, the control circuitry 208 may prepare a report and/or visualization depicting the final policy of the policy engine 210, the state of the environment 110, any diagnostic or debugging messages, logs from the agent circuitry 212, and/or the like, which in turn may be presented to a user using communications hardware 206.

FIGS. 3A, 3B, and 4 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be implemented by execution of software instructions. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a non-transitory computer-readable memory that may direct a computing device or other programmable apparatus to function in a particular manner, such that the software instructions stored in the computer-readable memory comprise an article of manufacture, the execution of which implements the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

CONCLUSION

As described above, example embodiments provide methods and apparatuses that enable improved detection of security vulnerabilities in computer systems. Example embodiments thus provide tools that overcome limitations of traditional penetration testing. By eliminating the need for trained human agents to plan and execute simulated tests in the context of a penetration test, the time and cost for such testing can be drastically reduced. Moreover, embodiments described herein may use LLMs to further automate social dimensions of hacking and incorporate social interactions into penetration testing, which may be rapidly executed in simulated environments or more thoroughly tested in realistic environments.

As these examples all illustrate, example embodiments contemplated herein provide technical solutions that solve real-world problems faced during penetration testing. While automation has improved the efficiency of penetration testing, allowing an AI agent to learn and make decisions regarding penetration testing in a controlled environment provides a major improvement to technical capabilities to detect security vulnerabilities. At the same time, the use of LLMs and other technology such as speech synthesis opens up new avenues for incorporating social interactions into the automated penetration test that were previously not possible, and example embodiments described herein thus represent a technical solution to these real-world problems.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for determining a security vulnerability of a system, the method comprising:

receiving, by communications hardware, a set of initial definitions comprising an environment, a set of states, and a set of rewards based on the set of states;

initializing, by control circuitry, a policy;

selecting, by a policy engine, an action based on the policy and a current state from the set of states;

executing, by agent circuitry, the action in the environment, wherein executing the action comprises, in an instance in which the action is a social engineering method:

generating, by a natural language engine, a script for the action, and providing, by the natural language engine, the script to a social interaction agent;

subsequent to executing the action in the environment, receiving, by the communications hardware, an observation of the environment;

determining, by the control circuitry, an updated state from the set of states based on the observation;

determining, by the policy engine, a reward based on the updated state; and updating, by the control circuitry, the policy based on the updated state, the action, and the reward.

2. The method of claim 1, further comprising:

determining, by the control circuitry, if a convergence criterion is met; and in an instance in which the convergence criterion is met, halting execution by the control circuitry.

3. The method of claim 1, wherein the set of states is represented using a set of knowledge graphs.

4. The method of claim 3, further comprising:

generating, by the control circuitry, an updated knowledge graph based on the observation of the environment, wherein determining the updated state comprises generating, by the control circuitry, the updated state based on the updated knowledge graph.

5. The method of claim 1, wherein the environment is a simulated environment.

6. The method of claim 1, wherein providing the script to the social interaction agent comprises:

generating, by the natural language engine, a set of instructions for a human agent based on the script; and providing, by the communications hardware, the set of instructions to the human agent, wherein the method further comprises receiving, by the communications hardware and from the human agent, an indication of a result from execution of the set of instructions by the human agent.

7. The method of claim 1, wherein the set of rewards is described by a reward function, wherein the reward function encourages gaining access to a specified computing device.

8. The method of claim 1, wherein the policy comprises a deep neural network.

9. The method of claim 8, wherein the policy further comprises a control system distinct from the deep neural network.

10. The method of claim 1, further comprising:

receiving, by the communications hardware, policy initialization data, wherein the policy initialization data comprises a set of actions, wherein the set of actions comprises a social engineering method, wherein initializing the policy is based on the policy initialization data.

11. The method of claim 10, wherein the policy initialization data comprises a behavior profile from one or more known groups.

12. The method of claim 1, wherein the environment comprises a post-quantum cryptography (PQC) protected system, wherein a reward from the set of rewards is based on accessing the PQC protected system.

13. An apparatus for determining a security vulnerability of a system, the apparatus comprising:

communications hardware configured to receive a set of initial definitions comprising an environment, a set of states, and a set of rewards based on the set of states;

control circuitry configured to initialize a policy;

a policy engine configured to select an action based on the policy and a current state from the set of states; and agent circuitry configured to execute the action in the environment, wherein executing the action comprises causing a natural language engine to, in an instance in which the action is a social engineering method:

generate a script for the action, and provide the script to a social interaction agent, wherein the communications hardware is further configured to, subsequent to executing the action in the environment, receive an observation of the environment, wherein the control circuitry is further configured to determine an updated state from the set of states based on the observation, wherein the policy engine is further configured to determine a reward based on the updated state, wherein the control circuitry is further configured to update the policy based on the updated state, the action, and the reward.

14. The apparatus of claim 13, wherein the control circuitry is further configured to:

determine if a convergence criterion is met; and in an instance in which the convergence criterion is met, halt execution.

15. The apparatus of claim 13, wherein the set of states is represented using a set of knowledge graphs.

16. The apparatus of claim 15, wherein the control circuitry is further configured to:

generate an updated knowledge graph based on the observation of the environment, wherein the control circuitry is further configured so that determining the updated state comprises generating the updated state based on the updated knowledge graph.

17. The apparatus of claim 13, wherein the environment is a simulated environment.

18. The apparatus of claim 13, wherein the agent circuitry is further configured so that providing the script to the social interaction agent comprises:

generating a set of instructions for a human agent based on the script; and providing the set of instructions to the human agent, wherein the communications hardware further configured to receive, from the human agent, an indication of a result from execution of the set of instructions by the human agent.

19. The apparatus of claim 13, wherein the set of rewards is described by a reward function, wherein the reward function encourages gaining access to a specified computing device.

20. An apparatus for determining a security vulnerability of a system, the apparatus comprising:

means for receiving, a set of initial definitions comprising an environment, a set of states, and a set of rewards based on the set of states;

means for initializing a policy;

means for selecting an action based on the policy and a current state from the set of states;
means for executing the action in the environment, wherein executing the action comprises, in an instance in which the action is a social engineering method:
generating a script for the action, and
providing the script to a social interaction agent;
means for, subsequent to executing the action in the environment, receiving an observation of the environment;
means for determining an updated state from the set of states based on the observation;
means for determining a reward based on the updated state; and
means for updating the policy based on the updated state, the action, and the reward.

* * * * *